United States Patent [19]

Scholz et al.

[11] 4,132,006
[45] Jan. 2, 1979

[54] PROCESS FOR DRYING CHLORINATED POLYMERS

[75] Inventors: Manfred Scholz, Hürth; Karl Kaiser; Horst Semmler, both of Brühl, all of Fed. Rep. of Germany

[73] Assignee: Hoechst Aktiengesellschaft, Frankfurt am Main, Fed. Rep. of Germany

[21] Appl. No.: 814,862

[22] Filed: Jul. 12, 1977

[30] Foreign Application Priority Data

Jul. 16, 1976 [DE] Fed. Rep. of Germany ....... 2632054

[51] Int. Cl.² ............................ F26B 3/08; F26B 3/10
[52] U.S. Cl. ......................................... 34/10; 34/57 R
[58] Field of Search .................................. 34/10, 57 R

[56] References Cited

U.S. PATENT DOCUMENTS

| | | | |
|---|---|---|---|
| 3,360,867 | 1/1968 | Sanderson | 34/10 |
| 3,513,561 | 5/1970 | Meyer et al. | 34/10 |
| 3,795,057 | 3/1974 | Fanaritis | 34/10 |

*Primary Examiner*—Leland A. Sebastian
*Attorney, Agent, or Firm*—Connolly and Hutz

[57] ABSTRACT

Chlorinated polymers obtained by a filter-separation procedure, in a moist form, especially a water-containing moist form, are dried. To this end, the moist polymer is predried in a first fluidized-bed drying zone, this being continuously operated, and is thereafter further dried in one or more further fluidized-bed drying zones disposed downstream, of the said first drying zone.

12 Claims, 1 Drawing Figure

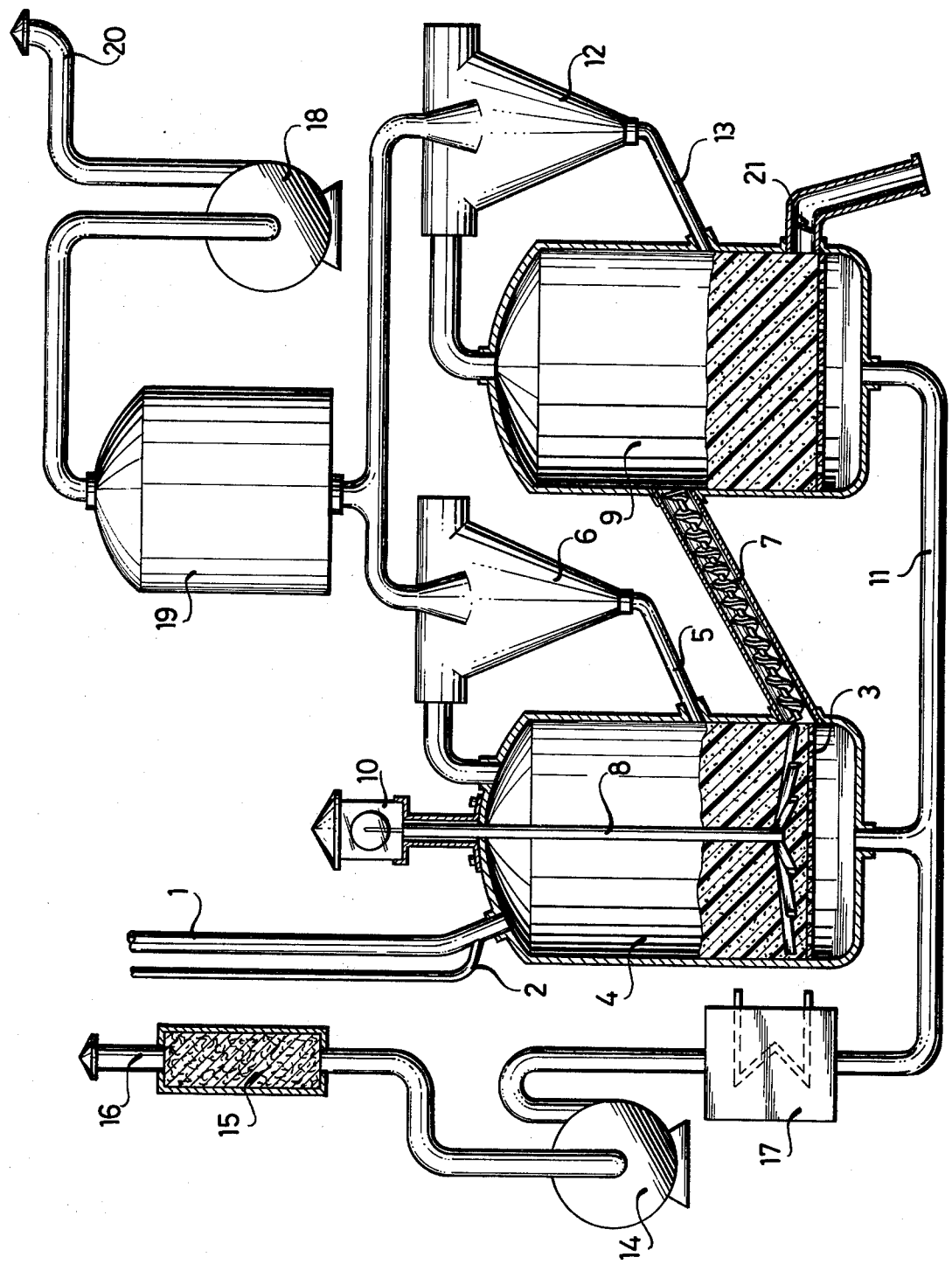

PROCESS FOR DRYING CHLORINATED POLYMERS

This invention relates to a process for drying chlorinated polymers which have been obtained, by a filter-separation procedure, in a moist form, especially a water-containing moist form.

German Patent Specification ("Offenlegungsschrift") No. 1595266, for example, describes a process wherein chlorinated polyolefins are produced batchwise in a vessel provided with an agitator by treating an aqueous olefin polymer suspension with chlorine. The resulting chlorinated polymers, when separated from the aqueous suspension, still contain 50 to 70 weight % of water. In industry, these moist polymers have heretofore been dried batchwise in a fluidized-bed drier provided with an agitator. Whenever the fluidized-bed drier receives a fresh batch, it is necessary to re-establish a fluidized bed in the drier by means of the agitator.

This batchwise drying of chlorinated polymers has serious disadvantages in respect of the following points: In industry, polymers are normally chlorinated in autoclaves disposed parallel with each other, and have to be operated in accordance with the operating cycle selected for the driers.

The moist polymers are liable to initially form a cone of loosely aggregated material on the receiving plate of the drier, which is distributed across the plate later by the agitator. Drying gas which is admitted through the plate to the drier preferentially flows initially through that portion of the plate which is not covered with polymeric material, and later through channels and slits formed in the polymeric material.

During that phase, the polymers are not effectively dried. The fludization, however, increases as the content of moisture in the material decreases, and a bed of fluidized material is ultimately produced in the drier under the disagglomerating action of the agitator. Only from this stage on can the drier be operated under optimum conditions which enable the injected drying gas, commonly pre-heated air, to be effectively utilized. Some types of polymer even tend, within certain limits of moisture content, to agglomerate irreversibly.

As a result of the considerable stress which the agitator is subjected to, especially at the start of the drying operation, and as a result of the fact that moist polymers are liable to agglomerate, it is necessary considerably to over-dimension this agitator, which incidentally undergoes heavy wear.

It is therefore an object of the present invention to provide a process which permits chlorinated polymers to be more rapidly dried than heretofore, enables the agglomeration of moist polymers to be avoided, and at the same time enables the drier's liability to fail to be reduced.

According to the present invention, we provide a technically simple process for drying a chlorinated polymer which has been obtained, by a filter-separation procedure, in a moist form, especially a water-containing moist form, wherein the moist polymer is predried in a first fluidized-bed drying zone, this being continuously operated, and is thereafter further dried in one or more further fluidized-bed drying zones disposed downstream of the said first drying zone.

As a drying gas and fluidizing medium for producing the fluidized beds, use is preferably made of air under a pressure of 1.01 to 1.3 bar, more preferably 1.05 to 1.15 bar. The drying gas may preferably be preheated to 50 to 150° C., more preferably 90 to 120° C.

It has also been found advantageous to pass the drying gas through the fluidized beds at a flow velocity of 0.5 to 10 meters per second, more preferably 1 to 4 meters per second, calculated on the internal cross-sectional area of the drying zones.

An ecologically highly beneficial version of the present process employs a circulated drying gas, preferably preheated air, and preferably the circulated gas is freed from moisture by condensation or absorption thereof.

In carrying out the process of the present invention, it is good practice, in the first fludized-bed drying zone, to additionally stir the moist polymer by means of an agitator, as also to inject it into and distribute it within that zone by means of compressed gas, preferably compressed air.

It is also advantageous to deliver the predried polymer from the first drying zone to the fluidized-bed drying zone(s) disposed downstream thereof by means of a screw conveyor.

The following two Examples illustrate the invention. The procedures employed in these Examples will be described with reference to the accompanying diagrammatic drawing, the single FIGURE of which is a partly-sectioned side view of an apparatus suitable for use in accordance with the present invention. Examples 1 and 2 describe a wholly continuous drying procedure and a partly continuous but partly batchwise drying procedure, respectively.

EXAMPLE 1

A bed of fluidized material was maintained in a first drier 4 by the supply of 1200 normal m$^3$ (S.T.P.) per minute of air to approximately 5000 kg of chlorinated polymer. The drier 4 had an internal diameter of 2.8 meters, corresponding to a flow velocity of the air of 3.2 meters per second. This zone of fluidized material was continuously fed through a tube 1 with 3250 kg per hour of chlorinated polymer with an average content of water of 57 weight %. During its introduction, the polymer was continuously distributed to some extent by means of 20 normal m$^3$ per minute of air which was admitted under a pressure of 6.5 bar, through a nozzle 2. An agitator 8 was used which was supported within the drier 4 by top mounting means as shown at 10. A perforated receiving plate 3 permitted the drying gas to be distributed. Polymer particles, which were separated in a cyclone 6, were recycled to the drier 4 through a conduit 5. In a second drier 9, a further bed of fluidized material was maintained by the supply of 450 normal m$^3$ per hour of air and approximately 4800 kg of polymer. The drier 9 had an internal diameter of 2.8 meters, corresponding to a flow velocity of the air of 1.2 meters per second. The bed of fluidized material in the drier 9 was charged by means of a screw conveyor 7 with 1750 kg per hour or predried polymer with an average water content of 20 weight %, coming from the drier 4. Polymer particles carried over were separated in a cyclone 12 and dropped back into the drier 9, through a conduit 13. The drying air was drawn in by a blower 14 via an air filter 15 and a suction intake 16 and compressed to 1.08 bar. In a heat exchanger 17, the air was heated with steam as the heating medium to 115 to 120° C., being then admitted to the respective drier (4 or 9) through a conduit 11. Off-gas containing steam coming from the cyclones 6 and 12 was passed through a water-scrubbing stage 19, exhausted by means of a blower 18 and allowed to escape into the atmosphere, through a chimney 20.

1400 kg per hour of polymer were continuously taken from the bed of fluidized material in the drier 9, through a flap 21. The polymer had an average residual content of moisture of 0.2 weight %.

EXAMPLE 2

The apparatus employed was as described in Example 1 with reference to the accompanying drawing, with modifications explicitly mentioned below.

A bed of fluidized material was maintained in the first drier 4 by the supply of 600 normal m³ per minute of air to approximately 5000 kg of chlorinated polymer. The drier 4 had an internal diameter of 2.8 meters, corresponding to a flow velocity of the air of 1.6 meters per second. This zone of fluidized material was continuously fed with 1700 kg per hour of chlorinated polymer with an average content of water of 53 weight %. During its introduction, the polymer was distributed to some extent by means of 20 normal m³ per minute of air which was admitted under a pressure of 6.5 bar. By means of the screw conveyor 7, altogether 2500 kg per hour of polymer with an average water content of 21 weight % were delivered from the first drier 4 to the second drier 9. The drier 9 was supplied with 400 normal m³ per hour of air at 100 to 105° C. The drier 9 had an internal diameter of 2.8 meters, corresponding to a flow velocity of the air of 1.1 meters per second. After an actual drying period of 2.5 hours, the drier 9 was emptied. The polymer had an average residual content of moisture of 0.1 weight %. Following this batchwise drying in the second drier 9, a third drier, identical to the drier 9 but not shown in the drawing, was set in operation, being charged, by means of a screw conveyor like the conveyor 7, with further predried polymer coming from the first drier 4.

We claim:

1. In a process for drying a post-chlorinated polyolefin which has been obtained by a filter separation procedure in moist form, the improvement which comprises atomizing the filtered moist post-chlorinated polyolefin, introducing the resulting polyolefin continuously into a first continuously operated fluidized bed drying zone provided with an agitator and pre-drying the polyolefin therein by means of a drying gas, introducing the predried polyolefin into at least one further batchwise operated fluidized bed drying zone downstream of the first fluidized bed drying zone and completely drying the polyolefin therein by means of the drying gas, the drying gas admitted to the first and second fluidized bed drying zones being heated to a temperature of 50 to 150° C.

2. The process as claimed in claim 1, wherein preheated air is used as a drying gas and as a fluidizing medium for producing the fluidized beds.

3. The process as claimed in claim 2, wherein preheated air at a pressure of 1.01 to 1.3 bar is used as the drying gas and fluidizing medium for producing the fluidized beds.

4. The process as claimed in claim 3, wherein air at a pressure of 1.05 to 1.15 bar is used as a drying gas and a fluidizing medium for producing the fluidized beds.

5. The process as claimed in claim 4, wherein air preheated to 90 to 120° C. is used as a drying gas.

6. The process as claimed in claim 1, wherein a drying gas is passed through the fluidized beds at a flow velocity of 0.5 to 10 meters per second, calculated on the internal cross-sectional area of the drying zones.

7. The process as claimed in claim 6, wherein the drying gas is passed through the fluidized beds at a flow velocity of 1 to 4 meters per second, calculated on the internal cross-sectional area of the drying zones.

8. The process as claimed in claim 1, wherein a circulated drying gas is employed.

9. The process as claimed in claim 8, wherein the circulated drying gas is freed from moisture by condensation or absorption thereof.

10. The process as claimed in claim 1, wherein the moist polymer is injected into, and distributed within, the first fluidized-bed drying zone by means of compressed gas.

11. The process as claimed in claim 1, wherein the predried polymer is delivered from the first drying zone to the fluidized-bed drying zone(s) disposed downstream thereof by means of a screw conveyor.

12. The process as claimed in claim 10, wherein the moist polymer is injected into, and distributed within, the first fluidized-bed drying zone by means of compressed air.

* * * * *